United States Patent
Malvasi et al.

(10) Patent No.: US 7,294,276 B2
(45) Date of Patent: Nov. 13, 2007

(54) PROCESS FOR PREPARING FLUOROPOLYMER DISPERSIONS

(75) Inventors: Marco Malvasi, Alessandria (IT); Tiziana Poggio, Alessandria (IT); Valeri Kapeliouchko, Alessandria (IT)

(73) Assignee: Solvay Solexis S.p.A., Milan (IT)

(*) Notice: Subject to any disclaimer, the term of this patent is extended or adjusted under 35 U.S.C. 154(b) by 0 days.

(21) Appl. No.: 11/319,802

(22) Filed: Dec. 29, 2005

(65) Prior Publication Data

US 2006/0144794 A1 Jul. 6, 2006

(30) Foreign Application Priority Data

Dec. 30, 2004 (IT) .......................... MI2004A2553

(51) Int. Cl.
*C02P 1/42* (2006.01)
*C08L 27/12* (2006.01)

(52) U.S. Cl. ...................... 210/683; 210/915; 210/743; 524/544

(58) Field of Classification Search ................ 210/683, 210/915, 743; 524/544
See application file for complete search history.

(56) References Cited

U.S. PATENT DOCUMENTS

| | | | |
|---|---|---|---|
| 2,559,752 A | 7/1951 | Berry | |
| 3,037,953 A | 6/1962 | Marks et al. | |
| 3,271,341 A | 9/1966 | Garrison, Jr. | |
| 3,301,807 A | 1/1967 | Hoashi | |
| 3,536,643 A | 10/1970 | Stryker et al. | |
| 3,704,272 A | 11/1972 | Holmes | |
| 4,369,266 A | 1/1983 | Kuhls et al. | |
| 4,380,618 A | 4/1983 | Khan et al. | |
| 4,864,006 A | 9/1989 | Giannetti et al. | |
| 4,990,283 A | 2/1991 | Visca et al. | |
| 5,789,508 A | 8/1998 | Baker et al. | |
| 6,136,893 A | 10/2000 | Yamashita et al. | |
| 6,297,334 B1 | 10/2001 | Marchese et al. | |
| 6,479,591 B2 | 11/2002 | Kapeliouchko et al. | |
| 6,518,352 B1 | 2/2003 | Visca et al. | |
| 6,576,703 B2 | 6/2003 | Kapeliouchko et al. | |
| 6,794,550 B2 | 9/2004 | Hintzer et al. | |
| 6,833,403 B1 | 12/2004 | Blädel | |
| 2003/0153674 A1 | 8/2003 | Visca et al. | |
| 2003/0220442 A1 | 11/2003 | Epsch et al. | |
| 2004/0167236 A1 | 8/2004 | Grootaert et al. | |

FOREIGN PATENT DOCUMENTS

| | | |
|---|---|---|
| EP | 1 155 055 B1 | 11/2001 |
| EP | 1 364 972 A1 | 11/2003 |
| EP | 1 526 142 A1 | 4/2005 |
| EP | 1 538 177 A1 | 6/2005 |
| WO | WO 03/051988 A2 | 6/2003 |

OTHER PUBLICATIONS

Kirk-Othmer, Encyclopedia of Chemical Technology, 14, 1995; pp. 737-783.
Kirk-Othmer, Encyclopedia of Chemical Technology, 18, III Ed. pp. 720-744.
Kirk-Othmer, Encyclopedia of Chemical Technology, 18, III Ed. 1982, pp. 720-744.

*Primary Examiner*—Chester T. Barry
(74) *Attorney, Agent, or Firm*—Arent Fox LLP

(57) ABSTRACT

A process to substantially remove the fluorinated anionic surfactants from fluoropolymer dispersions comprising the following steps:
  a) addition to the fluoropolymer dispersion of an anionic polyelectrolyte;
  b) contact of the dispersion with an anionic exchanger;
  c) separation of the dispersion from the anionic exchanger and recovery of the dispersion substantially fluorinated anionic surfactant free.

36 Claims, No Drawings

PROCESS FOR PREPARING FLUOROPOLYMER DISPERSIONS

The present invention relates to a process for preparing aqueous fluoropolymer dispersions substantially fluorinated surfactant free, in particular fluorinated ionic surfactant free.

More specifically the present invention relates to a process for preparing dispersions of fluoropolymers substantially perfluorooctanoate free in the form of acid or its salts.

With aqueous dispersions of fluoropolymers substantially fluorinated anionic surfactant free it is meant that the fluorinated surfactant content referred to the fluoropolymer weight is lower than 100 ppm, in particular lower than 50 ppm, more in particular lower than 5 ppm.

It is well known in the prior art that for the production of fluorinated polymers there are two different polymerization processes: the suspension polymerization and the emulsion polymerization. In suspension polymerization polymer granules having millimetric sizes are obtained. In emulsion polymerization a colloidal aqueous dispersion is obtained having particle diameters of the order from some nanometers, generally from 10 nm, to hundreds of nanometers, from 100 nm to 400 nm. The fluoropolymer emulsion polymerization process is carried out with a mild stirring and in the presence of surfactants not acting as chain transfer agents to avoid to obtain low molecular weight fluoropolymers and therefore with poor mechanical properties. Said surfactants are called non telogenic surfactants, see for example U.S. Pat. No. 2,559,752. Salts of perfluoroalkanoic acid, in particular the ammonium salt and/or alkaline metal salts of the perfluorooctanoic acid, indicated hereinafter as PFOA, are industrially very often used. Other anionic (per) fluorinated surfactants are also used, see for example U.S. Pat. No. 3,271,341, U.S. Pat. No. 4,380,618, U.S. Pat. No. 4,864,006, U.S. Pat. No. 5,789,508. The PFOA is the most industrially used surfactant in the emulsion polymerization since it is not telogen, thus allowing to obtain dispersions of fluorinated polymers having high molecular weight and allows to obtain stable dispersions for long periods of time. It is also known that in the applications of fluoropolymer dispersion, as coating or in the impregnation of fibers, in particular glass fibers, said fluorinated surfactants can reach the environment, for example through the washing effluents, or disperse in the atmosphere during the drying and/or sintering steps. However some of said surfactants have been classified as dangerous for the environment and are characterized by a low bioelimination rate from the human body. For example, the PFOA seems to belong to the surfactants particularly dangerous for the environment and with long residence times in men. Therefore there is a request from users of fluoropolymer dispersions substantially fluorinated anionic surfactant free and in particular PFOA free.

The fluoropolymer dispersions are obtained from the emulsion polymerization process with a concentration of the fluorinated polymer between 20% and 35% by weight referred to 100 parts by weight of the dispersion.

The fluoropolymer dispersions obtained from the polymerization process can be subjected to post-treatments to obtain concentrated fluoropolymer dispersions, even up to 75% w/w. The concentration processes can be carried out, for example, by a decantation, as described, for example, in U.S. Pat. No. 3,037,953, U.S. Pat. No. 3,704,272 and U.S. Pat. No. 3,301,807. Another concentration process of the fluoropolymer dispersions is the so called ultrafiltration process, as described for example in U.S. Pat. No. 4,369,266 and U.S. Pat. No. 6,136,893. In U.S. Pat. No. 4,369,266 a variant of the ultrafiltration process is described, allowing to obtain aqueous fluoropolymer dispersions substantially fluorinated anionic surfactant free, for example PFOA free. The process is based on the dialysis of the fluoropolymer dispersion and the permeate is purified from PFOA by using anionic exchange resins. This process can be industrially carried out. The drawback is that the dialysis process is slow, in particular for obtaining fluoropolymer dispersions having a very low PFOA content, lower than 10 ppm referred to the polymer weight. It is also known a process for obtaining polymeric dispersions substantially PFOA free by direct contact with anionic exchange resins of the dispersion stabilized with a nonionic surfactant. See for example U.S. Pat. No. 3,536,643, EP 1,155,055, WO 03/051988, US 2003/0220442.

In U.S. Pat. No. 6,794,550 a process is described for obtaining dispersions substantially PFOA free by distillation of the dispersion with a pH between 1 and 3. Said process has the drawback to imply a strong destabilization of the dispersion and a high probability of coagulum formation. Furthermore there is the drawback that a remarkable foam amount is formed causing problems for the industrial process.

The fluoropolymer dispersions obtainable by an emulsion, or microemulsion polymerization process, generally have the following characteristics:

particle diameter from 10 nm to 400 nm, preferably from 20 nm to 300 nm;

fluoropolymer concentration from 10% to 45% by weight, preferably from 20% to 35%;

amount of fluorinated anionic surfactant in the range 800 ppm and 200,000 ppm, preferably from 1,200 ppm to 6,000 ppm referred to the polymer weight.

From the industrial point of view the polytetrafluoroethylene (PTFE) dispersions obtainable by an emulsion polymerization process typically have an average particle diameter from 180 nm to 400 nm, preferably from 200 nm to 300 nm, still more preferably from 220 nm to 280 nm. The amount of fluorinated anionic surfactant is from about 2,500 ppm to about 5,000 ppm, preferably from 3,000 ppm to 4,000 ppm, referred to the polymer weight. Processes to obtain polytetrafluoroethylene (PTFE) dispersions having a dimeter between 10 nm and 100 nm, preferably from 20 nm to 80 nm, still more preferably from 30 nm to 70 nm, for example by microemulsion polymerization, are known in the prior art. See for example U.S. Pat. No. 6,297,334. Typically said dispersions contain an amount of fluorinated anionic surfactant in the range from about 800 ppm to about 200,000 ppm, preferably from 1,200 ppm to 40,000 ppm referred to the polymer weight.

For industrial applications, said dispersions are concentrated, for example by heating in the presence of a nonionic surfactant or by ultrafiltration, to a solid content up to 75% of fluoropolymer, see the above references.

The Applicant has found that by using the process for obtaining polymeric dispersions substantially PFOA free by direct contact with anionic exchange resins of the dispersion stabilized with a nonionic surfactant, for example Triton®X100 and Genapol®X-080, as described in U.S. Pat. No. 3,536,643, EP 1,155,055, WO 03/051988, there is the drawback of the foam formation in the plants and in the handling and pumping lines, as well as in the ionic exchange columns in case of a process carried out in a continuous way.

The need was therefore felt of a process to substantially remove fluorinated anionic surfactants from fluoropolymer dispersions by ionic exchange resins, without foam formation during the process.

It has been found by the Applicant a process solving the above mentioned technical problem.

It is an object of the present invention a process to substantially remove fluorinated anionic surfactants from fluoropolymer dispersions comprising the following steps:
a) addition to the fluoropolymer dispersion of an anionic polyelectrolyte;
b) contact of the dispersion with an anionic exchanger;
c) separation of the dispersion from the anionic exchanger and recovery of the dispersion substantially fluorinated anionic surfactant free.

Preferably, before step a) the pH of the fluoropolymer dispersion is adjusted to a pH value in the range from 7 to 12, preferably from 8 to 10. The base used can be a strong or weak, organic or inorganic base; an inorganic base, still more preferably an ammonia aqueous solution is preferably used.

The fluoropolymer dispersion used in the process of the present invention is obtained by an emulsion or microemulsion polymerization process. The fluoropolymer concentration is generally in the range 10%-45%, preferably 20%-35%.

The anionic polyeletrolytes of the invention, in comparison with the nonionic surfactants, as for example Triton® X100 and Genapol® X-080, are characterized in that, during the time of the treatment of the fluoropolymer dispersion to remove the PFOA with the anionic exchange resin, do not substantially produce foam in the vessel wherein the invention process is carried out. On the contrary, when the mentioned nonionic surfactants are used, there is formation of remarkable amounts of foam making more difficult the process management.

The polyelectrolytes are generally characterized in that they have a reduced surface activity in aqueous solutions. The last behaviour is indeed typical of polyelectrolytes differently from surfactants. The latter, e.g. nonionic surfactants, substantially reduce the surface tension of the aqueous solutions. As a matter of fact the polyelectrolytes are often used as flocculating agents of colloidal dispersions. The surfactants are instead normally used to stabilize colloidal dispersions.

The value of the surface tension of the dispersions obtainable with the invention process is higher than 35 dyne/cm at 25° C., preferably higher than 40 dyne/cm, still more preferably higher than 45 dyne/cm.

The anionic polyelectrolytes usable in step a) of the process of the present invention are anionic polymers, having a linear or branched structure, with anionic groups distributed along the polymeric chain, optionally present also in the chain end groups. The polyeletrolytes generally have an equivalent weight, defined as molecular weight/number of anionic groups present in the polyelectrolyte, higher than 150, preferably higher than 200, still more preferably higher than 250. Generally the equivalent weight of the anionic polyelectrolytes usable in the process of the present invention is lower than 50,000, preferably lower than 10,000, more preferably lower than 3,000, still more preferably lower than 1,500.

The number average molecular weight of the anionic polyelectrolytes is higher than 500, preferably higher than 1,000. The molecular weight of said anionic polyelectrolytes according to the present invention is generally lower than 1,000,000.

The anionic polyelectrolytes usable in the process according to the present invention contain in the molecule a number of anionic functional groups higher than or equal to 2, geneally higher than or equal to 5. The anionic groups present in the molecule of the anionic polyelectrolytes are preferably selected from carboxylates, sulphates, sulphonates, phosphates, phosphonates; more preferably carboxylates, sulphates, sulphonates, still more preferably carboxylates. Generally said anionic polyelectrolytes do not contain fluorine atoms.

Preferably the anionic polyelectrolytes usable in the process according to the present invention are selected from anionic homopolymers or copolymers of monomers selected from acrylic or vinylic monomers and containing a number of anionic groups as mentioned above, capable to give the equivalent weight as defined above.

As acrylic comonomers it can for example be mentioned: (meth)acrylamide; (meth)acrylic acid in the form of the corresponding salts; (meht)acrylonitrile, linear or branched $C_1$-$C_4$ hydroxyesters of the (meth)acrylic acid as for example hydroxyethyl(meth)acrylate, hydroxypropyl(meth)acrylate, hydroxybutyl(meth)acrylate; $C_1$-$C_{12}$ alkyl(meth)acrylates, wherein the alkyl can be linear or branched, as for example methyl (meth)acrylate, ethyl (meth)acrylate, propyl-(meth)acrylate, isopropyl(meth) acrylate, butyl(meth)acrylate, 2-ethylhexyl(meth)acrylate, and the compounds of the following general formula:

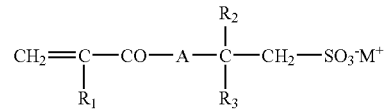

wherein: $R_1$ is H or $CH_3$; $R_2$ and $R_3$, equal or different, are H or $C_1$-$C_8$ alkyl, optionally branched; M is an alkaline or alkaline-earth metal or ammonium and A is NH, O or $NCH_3$.

Among the vinylic monomers the following monomers can be mentioned: vinylaromatic monomers, as styrene and its derivatives obtained by substituting one or more hydrogen atoms of the aromatic ring with a hydroxyl or a methyl and/or of vinyl with a methyl, for example α-methylstyrene; $C_1$-$C_{12}$ alkyl vinylethers, as methyl-, ethyl-, n-propyl-, isopropyl-, n-butyl-, isobutyl- and 2-ethylhexyl-vinyl ether; vinyl esters of $C_1$-$C_{18}$ aliphatic monocarboxylic acids, as vinyl acetate, vinyl propionate, vinyl butyrate, vinyl-2-ethylhexanoate, vinyl stearate.

Said homopolymers or copolymers of one or more monomers selected from acrylic or vinylic monomers are obtainable by aqueous suspension polymerization by radical or ionic addition, according to well known methods of the prior art. See for example Kirk Othmer "Encyclopedia of Chemical Technology", III Ed., vol. 18, pages 720-744. In case of radical polymerization in aqueous suspension, as radical initiators, those soluble in monomers are preferably used and furthermore suspending agents, surfactants are used.

As radical initiators, aliphatic and aromatic peroxides are for example used, as for example t-butylperoxy-2-ethylhexanoate, dibenzoylperoxide, benzoylperoxide, laurylperoxide, t-butylperoxydiethylacetate or unstable azocompounds as for example azodiisobutyronitrile. In the monomeric mixture also a chain transfer agent can optionally be used. Mercaptan compounds, as mercaptoethanol, mercaptopropanol, mercaptobutanol, mercaptoacetic acid, mercaptopropionic acid, butylmercaptan, n-dodecylmercaptan, can for example be mentioned. The polymerization temperatures are those at which there is the initiator decomposition, and are generally from 50° C. to 120° C. For the suspending agents see for example EP 457,356.

Other usable anionic polyelectrolytes are polyamic acids, preferably aromatic polyamic acids or polyamidoamic acids. Examples of repeating units of these polymers are:

amido-amic acid:

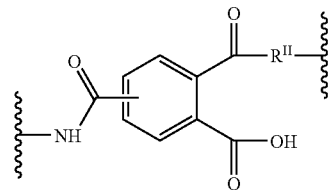

amidoimidic unit:

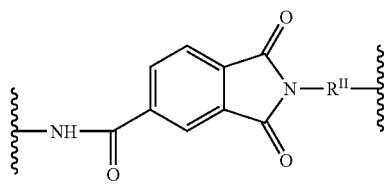

wherein $R^{II}$ is a divalent arylene radical. See for example U.S. Pat. No. 6,479,581.

For the preparation of these polymers see U.S. Pat. No. 6,479,581.

Other usable anionic polyelectrolytes are carboxyalkyl celluloses, wherein the alkyl comprises from 1 to 5 carbon atoms, preferably from 1 to 3, for example carboxymethylcellulose can be mentioned.

The polyelectrolytes usable in the process of the present invention are for example those known by the commercial name of Craymul® 8212 (Cray Valley), Torlon® AI30 (Solvay Advanced P), Torlon® AI50 (Solvay Advanced Polymers), Elvacite®2669, Elvacite®2776 (Lucite International), Joncryl®DFC 3025 (Johnson Polymer).

The invention polyelectrolyte is generally soluble in water, co-solvents miscible with water as alcohols, for example isopropyl alcohol, ketones, for example N-methylpyrrolidone, can optionally be added.

In step a) the polyelectrolyte is added in an amount generally comprised from 0.1% to 10%, preferably from 0.2% to 5%, still more preferably from 0.5% to 3% in percent by weight referred to the fluoropolymer weight. The polyelectrolyte amount generally depends on the type of polyelectrolyte used. By routine tests one is able to easily determine the minimum amount sufficient to obtain the results of the invention and not to have substantial coagulum phenomena.

Among the anionic exchange resins usable in step b) of the present invention process, the anionic exchange resins described in "Kirk-Othmer—Encyclopedia of Chemical Technology", vol. 14, pages 737-783, J. Wiley & Sons, 1995, can be mentioned. Among the preferred anionic exchange resins, the resins containing a tertiary or quaternary ammonium group can be mentioned. Among the preferred commercial resins, Amberjet®4400 OH (Rohm&Haas) and Dowex®MSA 1-C (Dow) can be mentioned.

The ionic exchange resins to be used in the process of the present invention can be strongly basic, average basic, weakly basic type. Preferably a strongly basic resin is used.

Step b) can be carried out in a continuous or discontinuous way, preferably in a discontinuous way. For example step b) can be carried out by addition of the anionic exchanger, under the form of granules having sizes of about 300-400 micrometers. The amount added is generally of the order from 1% to 10% by weight with respect to the dispersion weight.

In the discontinous process the mixture formed of the fluoropolymer dispersion containing the polyelectrolyte and of the ionic exchange resin is stirred, for example in a tank, for a time sufficient to remove the fluorinated surfactant at the desired value, for example lower than 5 ppm, and then the fluoropolymer dispersion is separated from the resin, for example by filtration.

Another embodiment of the invention process is to pass the fluoropolymer dispersion on a column filled with the ionic exchange resin of step b). In this embodiment a continuous way is preferably used.

In a continuous process, the fluoropolymer dispersion from which the fluorinated surfactant has to be removed, is fed through a column filled with the ionic exchange resin, or through more columns in series. The process can be repeated one or more times until reaching the desired fluorinated surfactant value. It is also possible to operate with a semi-continuous process, wherein the mixture formed of dispersion of the invention fluoropolymers and the ionic exchange resin, fed into a tank kept under stirring, is maintained under stirring for a time sufficient to remove the fluorinated surfactant at the desired value. Then the fluoropolymer dispersion is discharged from the tank and contemporaneously separated, for example by filtration from the resin, and a new dispersion to be treated is added to the tank.

In step b) the contact time between the polymeric dispersion and the anionic exchanger is generally lower than 24 hours, preferably lower than 8 hours, still more preferably lower than 4 or 2 hours.

The process of the present invention is generally carried out at temperatures comprised between 5° C. and 45° C. One or more electrolytes of the above classes can be used.

It has been surprisingly and unexpectedly found by the Applicant that the invention process allows to obtain fluoropolymer dispersions substantially fluorinated anionic surfactant free used in the fluoropolymer polymerization. Furthermore the productivity is high. An advantage of the process of the present invention is that there is no formation of foams during the process. In the process of the invention there are surprisingly no substantial fluoropolymer losses owing to coagulum formation. The used polyelectrolyte substantially remains in the fluoropolymer dispersion.

The results obtained with the invention process are surprising and unexpected since one would have expected that the anionic polyelectrolyte was removed from the dispersion during the contact with the anionic exchange resins, likewise it occurs for the anionic fluorinated surfactant present in the starting dispersion, so causing the dispersion coagulation.

As said, with the process of the present invention substantially fluorinated anionic surfactant free aqueous fluoropolymer dispersions, in particular perfluoroctanoate free in the form of acid or its salts, are obtained. With aqueous fluoropolymer dispersions substantially fluorinated surfactant free it is meant, as said, that the fluorinated surfactant content, referred to the fluoropolymer weight, is lower than 100 ppm, in particular lower than 50 ppm, more in particular lower than 5 ppm.

The polymerization processes to obtain the fluoropolymer dispersions usable in the process of the present invention are the emulsion or microemulsion polymerization processes.

The emulsion polymerization processes are described in the following patents in the name of the Applicant: U.S. Pat. No. 2,559,752, U.S. Pat. No. 4,380,618, U.S. Pat. No. 5,789,508, U.S. Pat. No. 6,479,591, U.S. Pat. No. 6,576,703 and in the patent application US 2003/0153674.

The microemulsion polymerization processes are described in the following patents in the name of the Applicant: U.S. Pat. No. 4,864,006 and U.S. Pat. No. 6,297,334. The microemulsions usable in the microemulsion polymerization processes are described in patents U.S. Pat. No. 4,864,006 and U.S. Pat. No. 4,990,283.

The dispersion fluoropolymers used in the process of the present invention are for example:
tetrafluoroethylene (TFE) homopolymers and TFE copolymers with monomers having at least one unsaturation of ethylene type;
thermoprocessable fluoropolymers (from the melt) based on TFE as PFA, MFA, FEP and ETFE;
VDF-based homopolymers and copolymers;
CTFE-based homopolymers and copolymers, for example PCTFE and E/CTFE copolymer;
VDF-based fluoroelastomers:
  VDF/HFP, optionally containing TFE and/or vinylethrs selected from perfluoroalkylvinylethers and/or perfluoroalkoxyalkylvinylethers; optionally containing hydrogenated olefins as ethylene and propylene;
TFE-based (per)fluoroelastomers:
  TFE copolymers with vinylethers selected from perfluoroalkylvinylethers and/or perfluoroalkoxyalkylvinylethers; in particular TFE/PMVE, TFE/PEVE, TFE/PPVE;
  TFE copolymers with hydrogenated olefins, preferably ethylene and/or porpylene;
  TFE and/or VDF amorphous and/or crystalline fluoropolymers containing dioxole rings having 5-7 atoms, in particular those obtained by copolymerization with (per)fluorodioxoles or with dienic monomers giving dioxole rings by cyclization.

The tetrafluoroethylene (TFE) copolymers with monomers having at least one unsaturation of ethylene type comprise comonomers of hydrogenated and fluorinated type. The comonomer amount is preferably lower than 3% by weight, preferably lower than 1% to have non thermoprocessable copolymers (the so called modified PTFE).

Among the hydrogenated comonomers, i.e. comonomers not containing fluorine, ethylene, propylene, acrylic monomers, for example methylmethacrylate, (meth)acrylic acid, hydroxyethylenacrylate, styrene monomers, as, for example, styrene, can be mentioned.

Among the fluorinated comonomers it can be mentioned:
$C_3$-$C_8$ perfluoroolefins, as hexafluoropropene (HFP);
$C_2$-$C_8$ hydrogenated fluoroolefins, as vinyl fluoride (VF), vinylidene fluoride (VDF), trifluoroethylene, $CH_2$=CH—$R_{f0}$ perfluoroalkylethylene, wherein $R_{f0}$ is a $C_1$-$C_6$ perfluoroalkyl;
$C_2$-$C_6$ chloro- and/or bromo- and/or iodo-fluorooelfins, as chlorotrifluoroethylene (CTFE);
$CF_2$=$CFOR_{f0}$ (per)fluoroalkykvinylethers (PAVE), wherein $R_{f0}$ is a $C_1$-$C_6$ (per)fluoroalkyl, for example $CF_3$, $C_2F_5$, $C_3F_7$;
$CF_2$=$CFOX_0$ (per)fluoro-oxyalkylvinylethers, wherein $X_0$ is a $C_1$-$C_{12}$ alkyl, or a $C_1$-$C_{12}$ oxyalkyl, or a $C_1$-$C_{12}$ (per)fluorooxyalkyl having one or more ether groups, for example perfluoro-2-propoxy-propyl;
fluorodioxoles, preferably perfluorodioxoles.

The preferred fluoropolymers of the dispersions obtainable by emulsion or microemulsion polymerization, usable in the process of the present invention, are the TFE copolymers or the TFE homopolymers. The fluorinated anionic surfactant, reduced with the process of the invention, is preferably PFOA.

The initial dispersion can be monomodal or bi- or multimodal. For the bi- and multimodal dispersions see for example patents U.S. Pat. No. 6,576,703, U.S. Pat. No. 6,518,352 in the name of the Applicant.

As said, the process of the present invention is characterized by a high productivity and substantially without fluoropolymer losses.

The fluoropolymer dispersions essentially fluorinated anionic surfactant free obtained with the process of the present invention are characterized by a good storage stability and can be used in the usual fluoropolymer applications. The dispersions obtainable with the process of the invention, as such or formulated, can also be used for the coating of surfaces of organic and/or inorganic polymers, of metals or ceramics; for the impregnation of fibers, preferably glass fibers, the cast film production, for the additivation of polymers or inorganic materials, etc.

The dispersions obtainable with the process of the present invention can be formulated with non ionic, anionic, cationic, amphoteric surfactants; with organic or inorganic compounds and/or fillers, for example, of inorganic type; with solvents, tixotropic agents; biocides; resins, for example acrylic, silicone, polyamidoimidic resins; polyethylenglycol, and other known additives of the prior art.

The dispersions obtainable with the invention process can be subjected to the conventional post-treatment processes as for example concentration by ultrafiltration or clouding processes. See patents U.S. Pat. No. 4,369,266, U.S. Pat. No. 3,037,953, U.S. Pat. No. 3,704,272, U.S. Pat. No. 3,301,807.

A further object of the present invention are fluoropolymer dispersions substantially fluorinated anionic surfactant free, obtainable according to the process of the present invention, comprising polyelectrolytes according to the present invention. These dispersions are stable. Non ionic surfactants as ethoxylated alkylphenols and ethoxylated alcohols can optionally be added, even if not necessary. These dispersions can be formulated as described above.

The following Examples illustrate with non limitative purposes the present invention.

EXAMPLES

Analytical Methods

The percentages reported in the Examples are percentages by weight, where not otherwise indicated.

Surface Tension Determination

The surface tension was measured at 25° C. with a Kruess K10 tensiometer and De Nouy ring, Harkins-Jordan corrective factors.

PFOA Determination

The PFOA is determined by gaschromatography, after conversion into the corresponding methyl ester, using an apparatus equipped with a split/splitless injector, a capillary column CP-SIL 5 CB (Chrompack®) and a feed detector. The detection limit of the method is 5 ppm.

Equivalent Weight (EW) Determination

The equivalent weight (EW), defined as the ratio molecular weight/(number of anionic groups present in the polyelectrolite molecule) wass calculated from the acid number (AN) by using the following formula:

$$EW=(56/AN)\times 10^3$$

wherein the acid number was determined by titration with KOH (equivalent weight 56) and it is given as $mg_{KOH}/100$ g of polyelectrolyte.

The molecular weight (MW) of the polyelectrolytes is that reported on the Product Data Sheet of the producer.

Critical Cracking Thickness Determination

The Critical Cracking thickness of the sintered film is determined by optical microscopy (magnification 100×) on a film applied by casting on an aluminium plate maintained at a constant inclination of 45° C. with respect to an horizontal plane, to obtain a thickness gradient from 0 to 10 µm on a length of 18 cm.

After drying at room temperature, the deposit was sintered at 400° C. for 10 minutes. The film critical cracking thickness is the maximum thickness of the film at which no cracks and surface defects are not yet found.

Glass Fabric Impregnation Test

The impregnation test on the glass fabric was carried out according to the following process:

dipping the glass fabric in the formulation at a dragging speed of 1.2 m/min;
passing the impregnated fabric between two squeezing rolls to remove the formulation excess;
drying the impregnated and squeezed glass fabric at 120° C., then sintering at 350° C. for about 30 seconds;
repeating the above process for six times.

The quantity in grams of deposited PTFE was determined by calculating the difference by weight between the sample after sintering and the weight of the uncoated sample fabric, referred to the surface of glass fabric expressed as $m^2$. Therefore the found PTFE deposited quantity is expressed as grams/($m^2$ glass fabric).

The surface of the coated glass fabric was also examined under an optical microscope (magnification 100×) for the presence of fractures.

Example 1

Emulsion Polymerization 11 grams of the ammonium perfluorooctanoate aqueous solution at 100 g/liter concentration and 31 liters of carefully degassed demineralized water are introduced into a 50 liter autoclave equipped with a mechanical stirrer and previously put under vacuum. In the reactor also 140 grams of paraffin having a softening point from 52° C. to 54° C. were previously introduced. The autoclave is kept under mechanical stirring and is pressurized with TFE up to a pressure of 20 bar at a temperature of 68° C. At this point 500 ml of a solution of $(NH_4)_2S_2O_8$ (APS) and disuccinic peroxide (DSAP) corresponding to 400 mg of APS and 2,000 mg of DSAP are fed into the autoclave.

When the pressure in the reactor has decreased of 0.5 bar, one starts to feed TEE by a compressor so as to maintain a constant pressure of 20 bar inside the reactor. In the meantime the internal reactor temperature is increased up to 78° C. at a rate of 0.5° C./min. During the reaction 50.6 g of the aqueous solution at 100 g/liter of ammonium perfluorooctanoate are fed into the autoclave. After 90 minutes, the TFE feeding is interrupted when 15,800 grams of TFE have reacted, the reactor evacuated and cooled. The discharged latex has a solid content equal to 30% w/w and the pH is equal to 3.9.

The average diameter of the polymer primary particles measured by Laser Light Scattering (LLS) is equal to 240 nm.

The PFOA content is 3,900 ppm with respect to the polymer.

Example 2-a

Preparation of an Aqueous Solution of an Acrylic Polyelectrolyte (Craymul® 8212—Cray Valley)

A commercial 40% by weight aqueous dispersion (pH 3.0-4.0) of an acrylic polyelectrolyte (Craymul® 8212) is used to prepare a limpid and homogeneous solution at 5% by weight by adding an ammonia aqueous solution and diluting with water. The molecular weight (MW) of the acrylic polyelectrolyte is about 100,000 and the equivalent weight given on the 40% by weight commercial aqueous dispersion is 1,000, that corresponds to an equivalent weight of 450 of the pure polyelectrolyte. The pH of said solution is about 9.

Example 2-b

Preparation of an Aqueous Solution of a Polyamidoimidic Polyelectrolyte (Torlon® AI-30—Solvay)

Starting from a commercial sample of powder at 30% by weight of polyamidoimidic polyelectrolyte (Torlon® AI-30), having molecular weight about 3,000 and equivalent weight 350, a limpid and homogeneous solution at 5% by weight is prepared, under stirring and mild heating at 40°-50° C., by addition of water and of a triethylamine aqueous solution. The pH of said solution is about 10.

Example 2-c

Preparation of an Aqueous Solution of a Polyamidoimidic Polyelectrolyte (Torlon® AI-50—Solvay)

Starting from a commercial sample of powder at 30% by weight of polyamidoimidic polyelectrolyte (Torlon® AI-50), having molecular weight about 3,000 and equivalent weight 370, a limpid and homogeneous solution at 5% by weight is prepared, under stirring and mild heating at 40°-50° C., by addition of water and of a triethylamine aqueous solution. The pH of said solution is about 10.

Example 2-d (Comparative)

Preparation of an Aqueous Solution of Polystyrensulphonate-Maleate (Ratio by Moles Styrene/Maleic Acid=1:1)

Starting from a commercial sample of sodium salt, under the form of powder, of the polyelectrolyte having molecular weight about 20,000 and equivalent weight 100, a limpid and homogeneous solution at 5% by weight is prepared by addition of water under stirring and mild heating at 40°-50° C. The pH of said solution is about 7.

Example 2-e (Comparative)

Preparation of an Aqueous Solution of Polystyrensulphonate-Maleate (Ratio by Moles Styrene/Maleic Acid=3:1)

Starting from a commercial sample of sodium salt, under the form of powder, of the polyelectrolyte having molecular weight about 20,000 and equivalent weight 130, a limpid and homogeneous solution at 5% by weight is prepared by addition of water under stirring and mild heating at 40°-50° C. The pH of said solution is about 7.

Example 2-f (Comparative)

Preparation of an Aqueous Solution of an Acrylic Polyelectrolyte (Acumer® 2200 Rohm&Haas)

Starting from a commercial sample of aqueous solution having pH 3.5-4.5 at 55% by weight of acrylic polyelectrolyte (Acumer® 2200), having molecular weight about 2,200 and equivalent weight 80, a limpid and homogeneous solution at 5% by weight is prepared, under stirring, by addition of water and of an aqueous NaOH solution. The pH of said solution is about 7.

Example 2-g (Comparative)

Preparation of an Aqueous Solution of an Acrylic Polyelectrolyte (Acumer® 9210 Rohm&Haas)

Starting from a commercial sample of sodium salt, under the form of a solution at 57% of the polyelectrolyte (molecular weight about 2,000 and equivalent weight 72), a limpid and homogeneous solution at 5% by weight is prepared by addition of water, under stirring and mild heating at 40°-50° C. The pH of said solution, is about 7.

Example 2-h (Comparative)

Preparation of an Aqueous Solution of an Acrylic Polyelectrolyte (Acumer® 9300—Rohm&Haas)

Starting from a commercial sample of sodium salt, under the form of a solution at 45% of the polyelectrolyte (molecular weight about 4,500 and equivalent weight 72), a limpid and homogeneous solution at 5% by weight is prepared by addition of water, under stirring and mild heating at 40°-50° C. The pH of said solution is about 7.

Example 3 (Comparative)

Treatment of the Polymeric Dispersion not Containing the Polyelectrolytes of the Invention with Ionic Exchange Resin To 500 g of the dispersion obtained according to the Example 1, the pH of which was adjusted at about 9 with an ammonia aqueous solution, 5% by weight of ionic exchange resin Amberjet® 4400 OH is added, referred to the sample weight. The mixture is put under mild stirring with a two-blade mechanical stirrer. Already after one hour from the beginning of the treatment, the dispersion appears coagulated.

Example 4

Treatment of the Polymeric Dispersion with Resins According to the Process of the Present Invention Starting from 500 g of the dispersion obtained according to the Example 1, the pH of which was adjusted at about 9 with an ammonia aqueous solution, and from the aqueous solution of Craymul® 8212 obtained according to the Example 2-a, a dispersion sample containing 1% of Craymul® 8212, referred to the PTFE weight, is prepared, by mixing in a beaker. The PTFE content of the so obtained sample is equal to 28.3% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, fluoropolymer coagulum free, is separated from the resins by filtration through a 150 μm mesh net. No presence of foam was noticed in the sample. The PTFE content of the obtained dispersion is equal to 28.3% by weight. The PFOA content, referred to the PTFE weight, is lower than 5 ppm.

Example 5

Starting from 500 g of the dispersion obtained according to the Example 1, the pH of which was adjusted at about 9 with an ammonia aqueous solution, and from the aqueous solution of Craymul® 8212 obtained according to the Example 2-a, a dispersion sample containing 0.5% of Craymul® 8212, referred to the PTFE weight, is prepared by mixing, in a beaker. The PTFE content of the so obtained sample is equal to 29.1% by weight. To said sample 5% by weight of ionic exchange resin Amberjet® 4400 OH, referred to the sample weight, is added. The mixture is maintained under mild stirring with a two-blade mechanical stirrer for 4 hours. At the end the dispersion, fluoropolymer coagulum free, is separated from the resins by filtration through a 150 μm mesh net. No presence of foam was noticed in the sample. The PTFE content of the obtained dispersion is equal to 29.1% by weight. The PFOA content, referred to the PTFE weight, is lower than 5 ppm.

Example 6

Starting from 40 kg of the dispersion obtained according to the Example 1, the pH of which was adjusted at about 9 with an ammonia aqueous solution, and from the aqueous solution of Craymul® 8212 obtained according to the Example 2-a, a dispersion sample containing 0.25% of Craymul® 8212, referred to the PTFE weight, is prepared by mixing in a glass reactor equipped with an outlet valve on the bottom. The PTFE content of the so obtained sample is equal to 29.6% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, fluoropolymer coagulum free, is separated from the resins by filtration through a 150 μm mesh net. No presence of foam is noticed in the sample. The PTFE content of the obtained dispersion is equal to 29.6% by weight. The PFOA content, referred to the PTFE weight, is lower than 5 ppm.

The surface tension of the obtained dispersion is 62 dyne/cm.

Example 6a

Concentration by Ultrafiltration of the Polymeric Dispersion Obtained According to the Process of the Present Invention 30 liters of the dispersion of the Example 6 are additioned with 1,800 g of Tergitol® TMN-100X at 25% by weight and then with 200 g of a solution of oxalic acid at 5% by weight.

The dispersion is concentrated in an ultrafiltration plant with tubular membranes having molecular cut of 200,000 dalton up to a concentration of 61% by weight of PTFE.

The so obtained dispersion contains 2.8% by weight of Tergitol® TMN-100X referred to the dispersion. The PFOA content referred to the PTFE is lower than 5 ppm.

Example 6b

Concentration by Clouding of the Polymeric Dispersion Obtained According to the Process of the Present Invention In a 3 liter thermostatable reactor, equipped with an outlet valve on the bottom, 1,800 g of the dispersion of the Example 6 are introduced, to which 360 g of Triton® X-100 at 25% by weight and then 9 g of an ammonium bisulphate solution at 10% by weight are added. The mixture is heated to the temperature of 67° C. under stirring. Once this temperature has been reached, the stirring is interrupted and the mixture allowed to decant for one our at the same temperature. It is observed separation of a concentrated phase in polymer in the lower part of the reactor and of an upper phase rich in surfactant Triton® X-100, which substantially does not contain PTFE. At the end the mixture is allowed to cool to room temperature and from the lower part of the reactor a concentrated dispersion is discharged, having a polymer content of 66% by weight and a Triton® X-100 content equal to 2.8% by weight. The PFOA content referred to the PTFE is lower than 5 ppm.

Example 7

Starting from 500 g of the dispersion obtained according to the Example 1, the pH of which was adjusted at about 9 with an ammonia aqueous solution, and from the aqueous solution of Torlon® AI-30 obtained according to the Example 2-b, a dispersion sample containing 5% of Torlon® AI-30, referred to the PTFE weight, is prepared by mixing, in a beaker. The PTFE content of the so obtained sample is equal to 23.1% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, fluoropolymer coagulum free, is separated from the resins by filtration through a 150 μm mesh net. No presence of foam was noticed in the sample. The PFOA content, referred to the PTFE weight, is lower than 5 ppm.

Example 8

Starting from 500 g of the dispersion obtained according to the Example 1, the pH of which was adjusted at about 9 with an ammonia aqueous solution, and from the aqueous solution of Torlon® AI-50 obtained according to the Example 2-c, a dispersion sample containing 5% of Torlon® AI-50, referred to the PTFE weight, is prepared, by mixing, in a beaker. The PTFE content of the so obtained sample is equal to 23.1% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, fluoropolymer coagulum free, is separated from the resins by filtration through a 150 μm mesh net. No presence of foam was noticed in the sample. The PFOA content, referred to the PTFE weight, is lower than 5 ppm.

Example 9

Starting from 500 g of the dispersion obtained according to the Example 1, the pH of which was adjusted at about 9 with an ammonia aqueous solution, and from the aqueous solution of Torlon® AI-50 obtained according to the Example 2-c, a dispersion sample containing 2% of Torlon® AI-50, referred to the PTFE weight, is prepared, by mixing, in a beaker. The PTFE content of the so obtained sample is equal to 26.8% by weight. To said sample 5% by weight of ionic exchange resin Amberjet® 4400 OH, referred to the sample weight, is added. The mixture is maintained under mild stirring with a two-blade mechanical stirrer for 2 hours. At the end the dispersion, fluoropolymer coagulum free, is separated from the resins by filtration through a 150 μm mesh net. No foam presence is noticed in the sample. The PFOA content, referred to the PTFE weight, is lower than 5 ppm.

The surface tension of the obtained dispersion is 64 dyne/cm.

Example 10 (Comparative)

Treatment of the Polymeric Dispersion with a Polyelectrolyte Having Equivalent Weight 100

Starting from 500 g of the dispersion obtained according to the Example 1, the pH of which was adjusted at about 9 with an ammonia aqueous solution, and from the aqueous solution of sodium-polystyrensulphonate-maleate (ratio by moles styrene/maleic acid=1:1) obtained according to the Example 2-d, a dispersion sample containing 1% of sodium-polystyrensulphonate-maleate, referred to the PTFE weight, is prepared by mixing, in a beaker. The PTFE content of the so obtained sample is equal to 28.3% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 11 (Comparative)

Starting from 500 g of the dispersion obtained according to the Example 1, the pH of which was adjusted at about 9 with an ammonia aqueous solution, and from the aqueous solution of sodium-polystyrensulphonate-maleate (ratio by moles styrene/maleic acid=1:1) obtained according to the Example 2-d, a dispersion sample containing 5% of sodium-polystyrensulphonate-maleate, referred to the PTFE weight, is prepared by mixing, in a beaker. The PTFE content of the so obtained sample is equal to 23.1% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 12 (Comparative)

Treatment of the Polymeric Dispersion with a Polyelectrolyte Having Equivalent Weight 130

Starting from 500 g of the dispersion obtained according to the Example 1, the pH of which was adjusted at about 9 with an ammonia aqueous solution, and from the aqueous solution of sodium-polystyrensulphonate-maleate (ratio by moles styrene/maleic acid=3:1) obtained according to the Example 2-e, a dispersion sample containing 1% of sodium-polystyrehsulphonate-maleate, referred to the PTFE weight, is prepared by mixing, in a beaker. The PTFE content of the so obtained sample is equal to 28.3% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 13 (Comparative)

Starting from 500 g of the dispersion obtained according to the Example 1, the pH of which was adjusted at about 9 with an ammonia aqueous solution, and from the aqueous solution of sodium polystyrensulphonate-maleate (ratio by moles styrene/maleic acid=3:1) obtained according to the Example 2-e, a dispersion sample containing 5% of sodium polystyrensulphonate-maleate, referred to the PTFE weight, is prepared by mixing in a beaker. The PTFE content of the so obtained sample is equal to 23.1% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 14 (Comparative)

Treatment of the Polymeric Dispersion with an Acrylic Polyelectrolyte Having Equivalent Weight 80

Starting from 500 g of the dispersion obtained according to the Example 1, the pH of which was adjusted at about 9 with an ammonia aqueous solution, and from the aqueous solution of Acumer® 2200 obtained according to the Example 2-f, a dispersion sample containing 1% of Acumer® 2200, referred to the PTFE weight, is prepared by mixing, in a beaker. The PTFE content of the so obtained sample is equal to 28.3% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 15 (Comparative)

The Example 14 (comparative) is repeated but by adding to the dispersion of the Example 1, the pH of which was adjusted at about 9, 5% by weight of Acumer® 2200, referred to the PTFE weight. Already after one hour from the beginning of the treatment, the dispersion appears coagulated.

Example 16 (Comparative)

Treatment of the Polymeric Dispersion with an Acrylic Polyelectrolyte Having Equivalent Weight 72

Starting from 500 g of the dispersion obtained according to the Example 1, the pH of which was adjusted at about 9 with an ammonia aqueous solution, and from the aqueous solution of Acumer® 9210 obtained according to the Example 2-g, a dispersion sample containing 1% of Acumer® 9210, referred to the PTFE weight, is prepared by mixing, in a beaker. The PTFE content of the so obtained sample is equal to 28.3% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 17 (Comparative)

The Example 16 (comparative) is repeated but by adding to the dispersion of the Example 1, the pH of which was adjusted at about 9, 5% by weight of Acumer® 9210, referred to the PTFE weight. Already after one hour from the beginning of the treatment, the dispersion appears coagulated.

Example 18 (Comparative)

Treatment of the Polymeric Dispersion with an Acrylic Polyelectrolyte Having Equivalent Weight 72

Starting from 500 g of the dispersion obtained according to the Example 1, the pH of which was adjusted at about 9 with an ammonia aqueous solution, and from the aqueous solution of Acumer® 9300 obtained according to the Example 2-h, a dispersion sample containing 1% of Acumer® 9300, referred to the PTFE weight, is prepared by mixing, in a beaker. The PTFE content of the so obtained sample is equal to 28.3% by weight. To said sample 5% by weight of ionic exchange resin Amberjet® 4400 OH, referred to the sample weight, is added. The mixture is put under mild stirring with a two-blade mechanical stirrer. Already after one hour from the beginning of the treatment, the dispersion appears coagulated.

Example 19 (Comparative)

The Example 18 (comparative) is repeated but by adding to the dispersion of the Example 1, the pH of which was adjusted at about 9, 5% by weight of Acumer® 9300, referred to the PTFE weight. Already after one hour from the beginning of the treatment, the dispersion appears coagulated.

Example 20 (Comparative)

Use of a Nonionic Surfactant Instead of a Polyelectrolyte in the Process of the Invention The Example 9 was repeated but by using Triton®X-100 instead of Torlon®AI-50 in the same amounts (2% by weight with respect to the PTFE weight). The PFOA content, referred to the PTFE weight, is lower than 5 ppm. However a substantial amount of persistent foam is noticed on the dispersion surface.

The surface tension of the obtained dispersion is 33 dyne/cm.

Example 21

Preparation of an Aqueous Solution of an Acrylic Polyelectrolyte (Joncryl®DFC 3025 Johnson Polymer)

Starting from a commercial sample of aqueous solution having pH 8.5 at 34% by weight of acrylic polyelectrolyte (Joncryl®DFC 3025), having molecular weight about 5,800 and equivalent weight 260, a limpid and homogeneous solution at 5% by weight is prepared under stirring, by addition of water and of an ammonia aqueous solution. The pH of said solution is about 9.

Example 22

Treatment of the Polymeric Dispersion with Resins According to the Process of the Present Invention Starting from 500 g of the dispersion obtained according to the example 1, example 6 is repeated but using the aqueous solution of the acrylic polymer of example 21. At the end the dispersion, fluoropolymer coagulum free, is separated from the resins by filtration through a 150 μm mesh net. No presence of foam is noticed in the sample. The PTFE content of the obtained dispersion is equal to 29.6% by weight. At the end the PFOA content, referred to the PTFE weight, is lower than 5 ppm.

Example 23

Preparation of an Aqueous Solution of an Acrylic Polyelectrolyte (Elvacite®2669 Lucite International)

Starting from a commercial sample of an acrylic polyelectrolyte (Elvacite®2669), having molecular weight about 58,000 and equivalent weight 450, it is obtained a limpid and homogeneous 5% by weight polymer solution by dissolving the polymer under stirring, by addition of water and of an ammonia aqueous solution. The final pH is 10.3.

Example 24

Treatment of the Polymeric Dispersion with Resins According to the Process of the Present Invention Starting from 500 g of the dispersion obtained according to the example 1, example 6 is repeated but using the aqueous solution of the acrylic polymer of example 23. At the end the dispersion, fluoropolymer coagulum free, is separated from the resins by filtration through a 150 μm mesh net. No presence of foam is noticed in the sample. The PTFE content of the obtained dispersion is equal to 29.6% by weight. At the end the PFOA content, referred to the PTFE weight, is lower than 5 ppm.

Example 25

Preparation of an Aqueous Solution of an Acrylic Polyelectrolyte (Elvacite®2776 Lucite International)

Starting from a commercial sample of an acrylic polyelectrolyte (Elvacite®2776), having molecular weight about 16,000 and equivalent weight 700, it is obtained a limpid and homogeneous 2.5% by weight polymer solution, by dissolving the polymer under stirring, by addition of water and of an ammonia aqueous solution. The final pH is 10.3.

Example 26

Treatment of the Polymeric Dispersion with Resins According to the Process of the Present Invention Starting from 500 g of the dispersion obtained according to the example 1, example 6 is repeated but using the aqueous solution of the acrylic polymer of example 25. At the end the dispersion, fluoropolymer coagulum free, is separated from the resins by filtration through a 150 μm mesh net. No presence of foam is noticed in the sample. At the end the PFOA content, referred to the PTFE weight, is lower than 5 ppm.

Example 27

Treatment of the Polymeric Dispersion with Resins According to the Process of the Present Invention Starting from 500 g of the dispersion obtained according to the example 1, the pH of which was adjusted at about 9 with an ammonia aqueous solution, and from the aqueous solution of Joncryl®DFC 3025 obtained according to the Example 21, a dispersion sample containing 0.1% of Joncryl®DFC 3025, referred to the PTFE weight, is prepared, by mixing in a beaker. The PTFE content of the so obtained sample is equal to 29.8% by weight. To said sample 5% by weight of ionic exchange resin Amberjet® 4400 OH, referred to the sample weight, is added. The mixture is maintained under mild stirring with a two-blade mechanical stirrer for 4 hours. At the end the dispersion, fluoropolymer coagulum free, is separated from the resins by filtration through a 150 μm mesh net. No presence of foam is noticed in the sample. The PTFE content of the obtained dispersion is equal to 29.8% by weight. At the end the PFOA content, referred to the PTFE weight, is lower than 5 ppm.

Example 28

Treatment with Resins According to the Process of the Present Invention and Concentration of the Polymeric Dispersion on an Industrial Scale 7600 Kg of an industrial PTFE dispersion at 33% by weight of the polymer is charged into a 20 m³ reservoir equipped with a one impeller two blade stirrer. The pH of the dispersion is adjusted at about 9 with an ammonia aqueous solution. 61 Kg of a 10.2% solution of Craymul®8212 are added in order to have a polyelectrolyte content, referred to the PTFE weight, of about 0.25% by weight. The PTFE content of the so obtained dispersion is equal to 32.7% by weight. 380 Kg of ion exchange Amberjet® 4400 OH, corresponding to 5% by weight referred to the dispersion, are added into the reservoir and the mixture is maintained under stirring for 6 hours. No presence of foam was noticed. At the end the dispersion is separated from the resin by filtration trough a 200 μm mesh net and afterwards concentrated as herein beow described.

3600 Kg of the treated dispersion are charged into a thermostatic reactor and 720 Kg of Tergitol® TMN-100X at 25% by weight and 18 Kg of a 10% by weight ammonium bisulphate aqueous solution are added. The mixture is heated to the temperature of 69° C. under stirring. At the temperature of 69° C. the stirring is interrupted and the mixture allowed tod ecant for one hour at 69° C. It is observed separation of a polymer rich bottom phase and of a surfactant Tergitol® TMN-100X rich upper phase which substantially does not contain PTFE. After cooling to room temperature, the polymer concentrated dispersion is discharged from the bottom of the reactor. Said dispersions had a polymer content of 68.5% by weight and a Tergitol® TMN-100X content of 2.2% by weight. The PFOA content, referred to the PTFE, is lower than 5 ppm.

Example 29

Applicative Example: Casting of the Dispersion O an Aluminium Plate and Impregnation of a Glass Fabric The concentrated PTFE dispersion obtained in Example 28 has been formulated by adjusting the polymer dry content at 60% weight and Tergitol® TMN-100X at a concentration of 5% by weight referred to the PTFE.

The casting on an aluminium plate was carried out as described herein above under the section "Analytical methods". The sintered film did not show any fracture through the whole gradient thickness (Critical Cracking Thickness>10 µm).

The above formulation was also used in an impregnation test as described herein above. At the end of the impregnation test the grams of deposited PTFE/m² coated glass fabric were found to be 210. The coating was found free from fractures, fish eyes or other defects due to film forming or wetting problems. Further, the coating appeared glossy and white. The characteristics of the impregnated glass fabric are resumed in Table 1.

Example 30 (Comparative)

Preparation of a Concentrated PTFE Dispersion Using Triton® X-100

A PTFE dispersion obtained as in Example 1 has been concentrated following the clouding procedure described in example 6b, without any treatment to reduce the PFOA content. The concentrated PTFE dispersion was formulated by adjusting the polymer dry content at 60% weight and Triton® X-100 at a concentration of 5, 0% by weight referred to the PTFE.

The PFOA content was of 400 ppm.

The glass fabric impregnation test was repeated using the herein above prepared concentrated dispersion. The grams of deposited PTFE/(m² coated glass fabric) were 151. The coating appeared yellow-coloured. The surface of the coated fabric was examined under a microscope as described under "Analytical methods". The presence of few fractures was evidenced.

Example 31 (Comparative)

Preparation of a Concentrated PTFE Dispersion Using Tergitol® TMN-100X

A PTFE dispersion obtained as in example 1 has been concentrated following the clouding procedure described in example 30, but using Tergitol® TMN-100X as a surfactant instead of Triton® X-100.

The glass fabric impregnation test was repeated using the herein above prepared concentrated dispersion. The grams of deposited PTFE/(m² coated glass fabric) were 154. The coating appeared white. On the coated glass fabric no fractures were found.

Example 32 (Comparative)

The PTFE dispersion formulated according to Example 31 was further added of an aqueous solution 0.2% by weight, calculated on the PTFE, of the polymeric thickener Fumexol®ND (ciba Geigy Specialty) (alcohol ethoxylated in tertbutylphosphate), in order to increase the quantity of PTFE deposited on the glass fabric. This technique is well known in the art.

The glass fabric impregnation test was repeated using the herein above prepared concentrated dispersion. The grams of deposited PTFE/(m² coated glass fabric) were 200. The coating appeared yellow and by inspecting the surface of the coated glass fabric with an optical microscope, as described under "Analytical methods", many fractures were evidenced.

Example 33

Applicative Example: Metal Coating

The formulation prepared in Example 28 was used in the preparation of an acrylic formulation, by adding the following components (on a wet basis):

5.0% by weight of an acrylic resin polymer Rhodopas®D906;
0.8% by weight of the sodium salt of lauryl acid;
2.0% by weight of xilene;
2.0% by weight of butylcellosolve.

Said formulation was sprayed on an aluminium plate previously treated with a black primer based on polyaminoimide resins, so as to obtain a thickness of about 30 µm. After drying at room temperature, the deposited film was sintered at 400° C. for 10 minutes. The thus obtained sintered film did not show any fracture (Critical Cracking Thickness >30 µm).

Comments on the Results of Table 1

The Table shows that the dispersions of the present invention applied on a glass fabric give high quality coatings, in particular the coatings do not show a yellow coloration and are fracture free at higher PTFE deposited (g PTFE/(m² of glass fabric) than those obtained with the comparative PTFE dispersions that contain nonionic surfactants but do not contain polyelectrolytes.

TABLE 1

Glass Fabric Impregnation test: Results of the PTFE deposit (g/m²), colour and fractures given by the coatings of ex. 29 according to the present invention and examples 30-31-32 Comparatives

|  | Ex. 29 | Ex. 30 Comp. | Ex. 31 Comp. | Ex. 32 Comp. |
|---|---|---|---|---|
| PTFE deposit (g/m²) | 210 | 151 | 154 | 200 |
| Film colour | White | Yellow | white | yellow |
| Appearance (fractures) | No fractures | some fractures | no fractures | many fractures |

The invention claimed is:

1. A process to reduce the fluorinated anionic surfactant content in a fluoropolymer dispersion, comprising the following steps:
    a) adding to the fluoropolymer dispersion an anionic polyelectrolyte having an equivalent weight, defined as molecular weight/number of anionic groups present in the electrolyte, higher than 150, wherein the anionic polyelectrolyte is a polymer having a linear or branched structure with anionic groups distributed along the polymeric chain;
    b) contacting the dispersion with an anionic exchanger;
    c) separating the dispersion from the anionic exchanger and recovering the dispersion, wherein the recovered dispersion has a fluorinated anionic surfactant content, defined by the weight of fluoropolymer, lower than 100 ppm.

2. A process according to claim 1, wherein before step a) the pH of the fluoropolymer dispersion is adjusted at a pH value in the range from 7 to 12.

3. A process according to claim 1, wherein the anionic polyelectrolytes usable in step a) are anionic polymers, having a linear or branched structure, with anionic groups distributed along the polymeric chain, optionally present also in the chain end groups.

4. A process according to claim 3, wherein the polyelectrolytes have an equivalent weight, defined as molecular weight/number of anionic groups present in the polyelectrolyte, higher than 200.

5. A process according to claim 3, wherein the equivalent weight of the anionic polyelectrolytes usable in the process of the present invention is lower than 50,000.

6. A process according to claim 3, wherein the number average molecular weight of the anionic polyelectrolytes is higher than 500 and lower than 1,000,000.

7. A process according to claim 3, wherein the anionic polyelectrolytes contain in the molecule a number of anionic functional groups higher than or equal to 2, said anionic groups being selected from carboxylates, sulphates, sulphonates, phosphates, and phosphonates.

8. A process according to claim 1, wherein the anionic polyelectrolytes do not contain fluorine atoms.

9. A process according to claim 1, wherein the anionic polyelectrolytes are selected from anionic homopolymers or copolymers of monomers selected from acrylic or vinyl monomers.

10. A process according to claim 9, wherein the acrylic comonomers are selected from (meth)acrylamide, (meth)acrylic acid in the form of the corresponding salts, (meth)acrylonitrile, linear or branched $C_1$-$C_4$ hydroxyesters of the (meth)acrylic acid, $C_1$-$C_{12}$ alkyl (meth)acrylates, wherein the alkyl can be linear or branched, compounds of the following general formula:

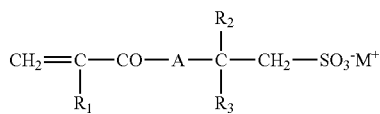

wherein: $R_1$ is H or $CH_3$; $R_2$ and $R_3$, equal or different, are H or $C_1$-$C_8$ alkyl, optionally branched; M is an alkaline or alkaline-earth metal or ammonium and A is NH, O or $NCH_3$.

11. A process according to claim 9, wherein the vinyl monomers are selected from vinylaromatic monomers; $C_1$-$C_{12}$ alkyl vinylethers; and vinyl esters of $C_1$-$C_{18}$ aliphatic monocarboxylic acids.

12. A process according to claim 1, wherein as anionic polyelectrolytes, polyamic acids.

13. A process according to claim 12, wherein the polyamic acids contain the following units:
amido-amic acid:

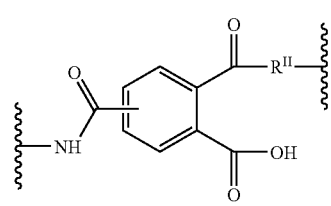

amidoimidic unit:

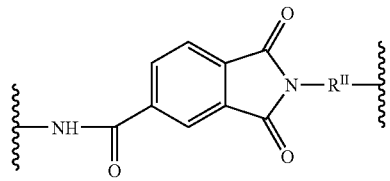

wherein R" is a divalent arylene radical.

14. A process according to claim 1, wherein the anionic polyelectrolytes are carboxyalkyl celluloses, wherein the alkyl comprises from 1 to 5 carbon atoms.

15. A process according to claim 1, wherein in step a) the polyelectrolyte is added in an amount comprised, in percent by weight referred to the fluoropolymer weight, from 0.1% to 10%.

16. A process according to claim 1, wherein step b) is carried out by a continuous or discontinuous process.

17. Fluoropolymer dispersions having a fluorinated anionic surfactant content, defined by fluoropolymer weight, lower than 100 ppm, and containing anionic polyelectrolytes with an equivalent weight, defined as molecular weight/number of anionic groups present in the polyelectrolyte, higher than 150, wherein the anionic polyelectrolytes are polymers having a linear or branched structure with anionic groups distributed along the polymeric chain.

18. A method of impregnating fibers by contacting said fibers with dispersions according to claim 17.

19. A process according to claim 1, wherein the recovered dispersion has a fluorinated anionic surfactant content lower than 50 ppm.

20. A process according to claim 1, wherein the recovered dispersion has a fluorinated anionic surfactant content lower than 5 ppm.

21. A process according to claim 2, wherein the pH of the fluoropolymer dispersion is adjusted to a pH value in the range from 8 to 10.

22. A process according to claim 4, wherein the polyelectrolytes have an equivalent weight higher than 250.

23. A process according to claim 5, wherein the equivalent weight of the anionic polyelectrolytes is lower than 10,000.

24. A process according to claim 5, wherein the equivalent weight of the anionic polyelectrolytes is lower than 3,000.

25. A process according to claim 5, wherein the equivalent weight of the anionic polyelectrolytes is lower than 1,500.

26. A process according to claim 6, wherein the number average molecular weight of the anionic polyelectrolytes is higher than 1,000 and lower than 1,000,000.

27. A process according to claim 7, wherein the anionic groups are selected from: carboxylates, sulphates, and sulphonates.

28. A process according to claim 7, wherein the anionic groups are carboxylates.

29. A process according to claim 11, wherein the vinyl monomers are selected from styrene and its derivatives obtained by substituting one or more hydrogen atoms of the aromatic ring with a hydroxyl or a methyl and/or of vinyl with a methyl.

30. A process according to claim 12, wherein as anionic polyelectrolytes, aromatic polyamic acids or polyamidoamic acids are used.

31. A process according to claim 14, wherein the alkyl comprises from 1 to 3 carbon atoms.

32. A process according to claim 15, wherein the polyelectrolyte is added in an amount comprised, in percent by weight referred to the fluoropolymer weight, from 0.2% to 5%.

33. A process according to claim 15, wherein the polyelectrolyte is added in an amount comprised, in percent by weight referred to the fluoropolymer weight, from 0.5% to 3%.

34. A process according to claim 16, wherein step b) is carried out by a discontinuous process.

35. Fluoropolymer dispersions of claim 17, wherein the fluorinated anionic surfactant content, defined by fluoropolymer weight is lower than 50 ppm.

36. Fluoropolymer dispersions of claim 17, wherein the fluorinated anionic surfactant content, defined by fluoropolymer weight is lower than 5 ppm.

* * * * *